United States Patent Office 2,725,363
Patented Nov. 29, 1955

2,725,363

CORROSION RESISTANT WRINKLE COATING COMPOSITIONS CONTAINING FINELY DIVIDED TITANIUM METAL OR ALLOY

Folsom E. Drummond, Washington, D. C., assignor to New Wrinkle, Inc., Chicago, Ill., a corporation of Delaware No Drawing. Application December 22, 1951, Serial No. 263,010

1 Claim. (Cl. 260—19)

This invention relates to liquid coating compositions and more particularly to resinous liquid coating compositions which are adapted to be applied to metal surfaces and dried to provide the same with a corrosion-resistant finish of the so called "wrinkle" type.

The "wrinkle" compositions of this invention comprise essentially finely divided particles of titanium metal or a titanium alloy, the particles of metal being suspended in a liquid vehicle. The compositions are adapted to be applied to metal surfaces by spraying, dipping, flow-coating or brushing and thereafter air dried or baked at suitable temperatures to produce a hard tenacious "wrinkle" coating thereon.

It has been known heretofore to prepare coating compositions utilizing finely divided metal, such as aluminum and zinc together with a vehicle such as alkali metal silicate and the like, and to apply such coating compositions to metal surfaces and bake the same to produce an insoluble coating film. While such coating compositions, particularly those containing finely divided zinc metal, have shown excellent resistance to corrosion when applied to metal surfaces and baked it is necessary to limit the concentration of the alkali metal silicate vehicle employed since the use of highly concentrated alkali silicate solutions tend to cause a reaction to take place between the alkali metal and zinc with evolution of hydrogen. This results in the formation of blisters in the coating film, which is of course undesirable. Further, a "wrinkle" drying coating composition is not provided which is desirable.

It is, accordingly, an object of this invention to overcome these disadvantages and provide a resinous, or resinous-oil "wrinkle" drying coating composition wherein particles of titanium metal or a suitable alloy thereof constitute the principal solids ingredient.

Another object of the invention is to provide a "wrinkle" type coating composition having efficacious corrosion-resistant properties and which may be applied onto a metal surface and dried to produce a protective coating film thereon which adheres firmly thereto and is abrasion resistant.

It is another object of this invention to provide coating compositions of the "wrinkle" drying type which contain substantial amounts of titanium metal, and which when applied to a metal surface and dried or baked produce a tough, tenacious film or finish for the article coated which is resistant to the corrosive action of boiling water as well as both acid and alkali solutions.

It is another object of this invention to provide a resinous type coating composition having antifouling properties and which is adapted to be applied to metal surfaces and air dried or baked to produce a "wrinkle" finish which is decorative and highly resistant to abrasion or chipping and the deleterious action of different corrosive atmospheres.

Another object of the invention is to provide a protective and decorative coating composition of this character which may be applied to metal surfaces by spraying, flowing, brushing and dipping, and which may comprise one or more coats, one coat being effective for producing an anti-corrosion and abrasive-resistant "wrinkling" film.

Still another object of the invention is to provide a coating composition comprising titanium metal powder or titanium metal alloy particles as a pigment or corrosion-resistant constituent, and which composition can be readily stored in a dip tank over long periods of time without deterioration or change in its composition.

A further object is to provide a resinous coating composition comprising substantial amounts of titanium metal particles which is adapted to be applied to the surface of an article and air dried or baked to form a "wrinkle" type protective coating thereover which adheres tenaciously thereto and is tough and flexible permitting bending of the metal without chipping or peeling away of the coating.

These and other objects and advantages of the invention will appear hereinafter as the description of the same proceeds.

In accordance with this invention a composition is prepared utilizing titanium metal, or an alloy thereof, as a powder dispersed in a vehicle comprising a resin or mixture of resins, oils having suitable driers, and pigment modifiers or fillers and solvent thinners incorporated therein to provide a finished product in the form of a liquid coating composition.

In the preparation of "wrinkle" type coating compositions either natural or synthetic resins and oils may be employed, it being necessary to use a certain minimum ratio of oil per 100 pounds of resin to obtain the desired "wrinkling" of the film. For example, using blown tung oil approximately 5 gallons of oil per 100 pounds of resin are required. Using blown perilla or blown linseed oil, 8 and 12 gallons respectively are needed.

The following examples of coating compositions are given which represent typical formulations applicable for providing compositions in accordance with this invention. The examples are given merely to illustrate certain embodiments of the invention and it is to be understood that the same is not limited specifically thereto.

Example I

| | | |
|---|---|---|
| Congo resin | lbs | 125 |
| Rosin | lbs | 6 |
| Red lead | lbs | 2¼ |
| Manganese borate | lb | 1 |
| Raw tung oil | gallons | 3 |
| Blown tung oil | do | 8 |
| Light petroleum naphtha | do | 6 |
| Toluol | do | 22 |

The above composition represents a typical formulation of a resinous composition which when applied and dried on surface produces a "wrinkle" finish. Such compositions and their application are described in the publication "The Science of Wrinkle Finishing" by W. A. Waldie, 1st Ed. 1949.

In compounding the above "wrinkling" composition, the Congo resin is melted in a suitable kettle and the raw tung oil is incorporated therewith. The rosin is thereafter added to prevent the mixture from gelling or polymerizing, the temperature not being allowed to rise above about 565° F. The red lead is then added and the mixture heated to around 565° F. The mixture is then allowed to cool to about 515° F. and the blown tung oil and manganese borate then added. The batch is then heated to around 510° F. and the heating discontinued. After the mass has cooled to around 390° F. the thinners are then introduced to produce the finished resinous vehicle.

To from 5 to 10 pounds of the above resinous varnish vehicle is incorporated 10 to 20 pounds of titanium metal powder, depending upon the consistency desired and the surface to be coated, to provide a coating composition in accordance with this invention. The resultant composition may be then thinned further with appropriate amounts of solvents, such as light petroleum naphtha or mineral spirits, to provide a liquid composition of the proper viscosity for application.

To produce a "wrinkle" finish the above composition is applied and baked to develope the "wrinkled" surface texture and produce a hard, dry film. The time required for baking depends on the particular formulation and "wrinkle" finish desired. In general the temperature employed ranges between about 200–300° F. and the baking time from 2–4 hours. The baking process may be conducted in a heated room, and utilizing forced air drying. For faster baking processes the coated material may be moved by a conveyor belt past a source of infra-red heat.

Titanium metal powder may be obtained from any suitable source and as prepared by different processes. One method of obtaining titanium metal suitable for use is by the reduction of titanium tetrachloride with magnesium, and crushing or grinding of the resultant spongy titanium metal to produce metal particles of suitable size for incorporating into the coating composition.

A modified resinous vehicle in which the titanium metal powder may be dispersed to form coating compositions in accordance with this invention and in which a synthetic resin is used instead of a natural resin is given below:

*Example II*

| | |
|---|---|
| Amberol resin (phenol formaldehyde rosin modified glycerol resin) lbs | 100 |
| Lead acetate lbs | 7 |
| Cobalt linoleate lb | ½ |
| Raw tung oil gallons | 18 |
| Heat bodied linseed oil do | 2 |
| Xylol do | 10 |
| Toluol do | 24 |

The resin in this instance is incorporated with the tung oil using a temperature of approximately 560° F., and the other constituents are incorporated similarly as in Example I.

To this synthetic resinous-oil vehicle is incorporated sufficient amount of titanium metal powder to produce the coating composition. Although the proportion of titanium powder incorporated in each instance may be varied over a relatively wide range, depending upon the consistency desired, and the bulking power of the metal powder used and absorptive capacity of the resinous-oil vehicle, generally about ½ to 5 pounds of titanium metal powder is corporated per gallon of the vehicle. The resultant mixture if too viscous may be thinned using further additions of xylol or toluol, or mixtures thereof, to produce a product having the required consistency for application as a spray, flow coating or brushing, as desired.

The following example illustrates a formulation for producing an air drying "wrinkle" finish containing titanium metal:

*Example III*

(1) 100 pounds of rosin modified phenol formaldehyde resin is heated with 8 gallons of liquefied oiticica oil to approximately 500 to 510° F. until a homogeneous dispersion is obtained. The heating is then discontinued and the mass allowed to cool down to about 350° F. Five gallons of xylol and 12 gallons of light petroleum naphtha is then added.

(2) Fifteen gallons of liquefied oiticica oil, 4 pounds of precipitated lead resinate and 5 pounds of precipitated cobalt resinate is heated together to about 500° F., to form a homogeneous mass, then 10 gallons of light gravity petroleum naphtha and 5 gallons of xylol is added.

To a blend of 6 gallons of varnish obtained under (1) and 4 gallons of the drier described under (2) is introduced 5 to 50 pounds of titanium metal powder or alloy as in Example I to provide a "wrinkle" drying coating.

The "wrinkle" drying vehicle utilized in this example for bonding the titanium metal particles to the surface being treated, is disclosed in the U. S. patent to W. A. Waldie 2,455,541 to which reference may be made. Similarly modified "wrinkle" drying varnishes, as therein disclosed, which may be caused to dry to a hard film of uniform texture at room temperature or under forced air-drying or baking temperatures may be employed as a liquid vehicle in which titanium metal or metal alloy particles are dispersed to form the composition of the present invention. Further, "wrinkle" drying varnishes comprising dehydrated castor oil in place of tung or oiticia oils may be utilized as the liquid vehicle in compounding the titanium metal coating compositions of the present invention. Synthetic resin formulations of the alkyd type which wrinkle upon application and drying are disclosed in the aforementioned publication of W. A. Waldie.

Titanium metal powder may comprise an alloy, such as an alloy of titanium with chromium and aluminum. A suitable alloy metal consists of about 5% chromium, 3% aluminum and remainder titanium. Mixtures of substantially pure titanium metal with a titanium alloy metal may also constitute the metal powder ingredient of the composition. The metal particles comprising principally titanium are uniformly dispersed throughout the "wrinkle" drying resinous-oil vehicle so that when the composition is applied and dried the film forming the coating comprises a homogeneous layer of titanium metal or metal alloy particles tenaciously bound to the metal surface.

In the above compositions, where it is desired to provide a product having a desired color, or shade, this may be done by introducing suitable color pigments. Up to as much as 10% or more of these pigments may be substituted for the titanium metal ingredient. For this purpose organic or inorganic color pigments may be utilized such as carbon blacks, toluidine reds, pigmented lakes and dyes, and the like. As inorganic pigments there may be used the lead and zinc chromates, molybdates, etc. To produce lighter shades the addition of lithopone, zinc and titanium oxides and barytes may be advantageously employed.

The inorganic filler or inert material used preferably consists of a siliceous porous material such as celite, which is a soft, siliceous earth, which enhances the dispersion of the metal particles of titanium. Other equivalent extenders or fillers may be used in place of celite, which substances comprise finely divided particles and function to aid in dispersing the metal powder. For example, finely powdered silica, abestine, and finely powdered magnesium oxides and carbonates and may be utilized for this purpose.

While the compositions described are primarily designed as a one-coat finish with respect to "wrinkle" drying films, one or more applications of the resinous-titanium metal coating compositions may be made, as where it is desired to provide a thick coating film on the surface treated.

It will be obvious that the compositions set forth in the specific examples may be modified by the substitution of equivalent constituents and that in this way widely different embodiments of this invention may be made without departing from the spirit and scope thereof. Accordingly, it will be understood that the particular resins or resinous oil vehicle, pigments, inerts and solvent thinners set forth in the specific examples are given by way of illustration only, and that the invention is not intended to be limited except as indicated in the appended claim.

Having thus described my invention, I claim:

A wrinkle drying coating composition comprising finely divided titanium metal particles bonded with an oleoresinous vehicle and which when applied to a surface and baked forms a tough, corrosion-resistant wrinkle film thereon, said composition consisting of the following constituents in the approximate proportionate amounts—a vehicle consisting of rosin-modified phenol formaldehyde resin 100 pounds, lead acetate 7 pounds, cobalt linoleate ½ pounds, raw tung oil 18 gallons, heat-bodied linseed oil 2 gallons, xylol 10 gallons, toluol 24 gallons said vehicle having incorporated therewith from ½ to 5 pounds of titanium metal powder per gallon of the vehicle.

References Cited in the file of this patent

UNITED STATES PATENTS

| | | |
|---|---|---|
| 2,344,189 | Waldie | Mar. 14, 1944 |
| 2,568,188 | Fisher | Sept. 18, 1951 |
| 2,568,189 | Fisher | Sept. 18, 1951 |

OTHER REFERENCES

Transactions of American Society for Metals, vol. 38 (1947), page 954.

Industrial and Engineering Chemistry, vol. 42, page 214 (February 1950).

"The Science of Wrinkle Finishing" by Waldie (1949), page 137.